United States Patent
Liu et al.

(10) Patent No.: US 9,247,459 B2
(45) Date of Patent: Jan. 26, 2016

(54) METHOD FOR ADDING A NEW QUALITY OF SERVICE TRAFFIC STREAM IN A MULTIPLE WIRELESS NETWORK ENVIRONMENT

(75) Inventors: Hang Liu, Yardley, PA (US); Mingquan Wu, Princeton Junction, NJ (US); John Li, Belle Mead, NJ (US); Xiuping Lu, Hillsborough, NJ (US); Ramkumar Perumanam, Edison, NJ (US); Saurabh Mathur, Monmouth Junction, NJ (US)

(73) Assignee: THOMSON LICENSING, Issy les Moulineaux (FR)

( * ) Notice: Subject to any disclaimer, the term of this patent is extended or adjusted under 35 U.S.C. 154(b) by 475 days.

(21) Appl. No.: 13/635,068

(22) PCT Filed: Apr. 29, 2010

(86) PCT No.: PCT/US2010/032878
§ 371 (c)(1),
(2), (4) Date: Sep. 14, 2012

(87) PCT Pub. No.: WO2011/136771
PCT Pub. Date: Nov. 3, 2011

(65) Prior Publication Data
US 2013/0010597 A1 Jan. 10, 2013

(51) Int. Cl.
*H04W 28/16* (2009.01)
*H04W 16/14* (2009.01)
*H04W 84/12* (2009.01)

(52) U.S. Cl.
CPC .............. *H04W 28/16* (2013.01); *H04W 16/14* (2013.01); *H04W 84/12* (2013.01)

(58) Field of Classification Search
None
See application file for complete search history.

(56) References Cited

U.S. PATENT DOCUMENTS

| 6,466,795 B1 | 10/2002 | Ahn |
| 6,788,702 B1 | 9/2004 | Garcia-Luna-Aceves et al. |

(Continued)

FOREIGN PATENT DOCUMENTS

| CN | 1505339 | 6/2004 |
| DE | 19939571 | 3/2000 |
| WO | WO2006026679 | 3/2006 |

OTHER PUBLICATIONS

Akl et al, "Dynamic Channel Assignment in IEEE 802.11 Networks," IEEE international Conference on Portabie Information Devices, 2007, PI, May 1, 2007; pp. 1-5.

(Continued)

*Primary Examiner* — Yemane Mesfin
*Assistant Examiner* — Peter Chen
(74) *Attorney, Agent, or Firm* — Robert D. Shedd; Jerome G. Schaefer

(57) ABSTRACT

Described herein are a method and apparatus including calculating an aggregate peak total traffic demand for all overlapping access points in an interference range, comparing the aggregate peak total traffic demand to a threshold, rejecting a requested new quality of service traffic stream responsive to results of the comparison, calculating a peak total traffic demand for each overlapping access point in the interference range if the requested new quality of service traffic stream is admissible responsive to results of the comparison, comparing the peak total traffic demand for each overlapping access point in the interference range, if the requested new quality of service traffic stream is admissible, to the threshold and one of accepting the requested new quality of service traffic stream and rejecting the requested new quality of service traffic stream responsive to results of the second comparison.

10 Claims, 4 Drawing Sheets

(56) References Cited

U.S. PATENT DOCUMENTS

| | | |
|---|---|---|
| 7,035,275 B2 | 4/2006 | Liang |
| 2004/0105416 A1 | 6/2004 | Rue |
| 2004/0203828 A1* | 10/2004 | Mirchandani et al. ..... 455/452.1 |
| 2007/0025310 A1 | 2/2007 | Weng et al. |
| 2007/0076662 A1* | 4/2007 | Jain et al. ...................... 370/331 |
| 2008/0031212 A1* | 2/2008 | Ogura ........................... 370/338 |
| 2008/0085723 A1* | 4/2008 | Tsao et al. ................. 455/452.2 |
| 2009/0180492 A1 | 7/2009 | Hu |
| 2009/0257380 A1 | 10/2009 | Meier |
| 2009/0270120 A1* | 10/2009 | Park .............................. 455/518 |
| 2011/0130149 A1* | 6/2011 | Yao et al. ...................... 455/453 |

OTHER PUBLICATIONS

Hong et al., "An Innovative Channel Management Strategy for Highly Reliable Handoff in Cellular Networks," Published online May 17, 2002, John Wiley & Sons, Ltd., Int'l Journal of Communication Systems, Oct. 2002, pp. 463-478.

\* cited by examiner

| Element ID | Length | Number of Reported Overlapping QLoads | Overlapping Qload 1 | ...... | Overlapping Qload n |
|---|---|---|---|---|---|

Fig. 2

| AP ID | Potential QLoad | Allocated QLoad |
|---|---|---|

Fig. 3

| Mean | Stdev | Number of Video Stream | Number of Voice Stream |
|---|---|---|---|

Fig. 4

METHOD FOR ADDING A NEW QUALITY OF SERVICE TRAFFIC STREAM IN A MULTIPLE WIRELESS NETWORK ENVIRONMENT

This application claims the benefit, under 35 U.S.C. §365 of International Application PCT/US10/32878, filed 29 Apr. 2010, which was published in accordance with PCT Article 21(2) on 3 Nov. 2011 in English.

FIELD OF THE INVENTION

The present invention relates to cooperation among overlapping wireless networks. In particular, the present invention relates to channel selection and channel sharing between wireless networks that overlap and operate on the same channel.

BACKGROUND OF THE INVENTION

In multicast and broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

A station can be any wireless device including but not limited to a computer, a laptop, a notebook computer, a personal digital assistant (PDA), a dual mode smart phone, user device, a client device, a mobile terminal and a mobile device. A station can be transmitter, a receiver or a transceiver. Data communicated between devices can be text, audio, video or multimedia or any other kind of data. Data is usually formatted into packets and or frames. That is, frames and packets are formats into which the data is packaged for transmission convenience.

In the past several years, there has been a rapid growth of wireless network deployment in school campuses, shopping malls, hotels, airports, apartment buildings, and in homes. Emerging technology such as IEEE 802.11n radios make delivering multimedia contents over wireless networks possible. This increased deployment drives the technology deeper into our daily lives. Since the number of available wireless channels is limited, these channels have to be used or shared by multiple access points (APs) or base stations (BSs). In a dense deployment environment, for example in a multi-dwelling unit deployment with many APs in an apartment building or hotel, APs tend to interfere with each other. This impacts the throughput of wireless networks including the quality of service for multimedia streaming applications.

In the prior art, it has been proposed that each WLAN access point (AP) advertise the WLAN traffic load and the total traffic load that it estimates in the directly overlapping APs/WLANs in order to help other APs select operating channels and sharing of the operating channels. The total shared traffic load information advertised (provided) by an AP is the sum of the allocated traffic of this AP/WLAN, plus the value of the allocated traffic load of the overlapping APs/WLANs. The overlapping APs/WLANs are the APs/WLANs that can "hear" and interfere each other. For example, in FIG. 1, AP1 will advertise the traffic load of WLAN1 in its beacon or other management (control) signal (frames, packets). If AP1 shares the same channel and can hear the beacons from AP2, AP3, and AP4, AP1 will also advertise the sum of the traffic load of AP1/WLAN1, AP2/WLAN2, AP3/WLAN3, and AP4/WLAN4 in the total shared traffic load field. If AP1 can only hear the beacons from AP2/WLAN2 and AP3/WLAN3, not AP4/WLAN4, the total traffic load field advertised by AP1 is the sum of the traffic load of AP1/WLAN1, AP2/WLAN2, and AP3/WLAN3. However the total traffic load information advertised by an AP in its beacon or other management (control) signals (frames, packets) causes ambiguity. For example in FIG. 1, when AP2 receives the total traffic load information from AP1, AP2 does not know whether the total traffic load value from AP1 includes the traffic load of AP4/WLAN4 or not because AP2 does not know whether AP1 can hear AP4/WLAN4 and considered and included the AP4's/WLAN4's traffic load information in AP1's estimation of the total traffic load. Therefore, AP2 cannot make an optimal channel selection decision or a decision to share the channel with AP1.

SUMMARY OF THE INVENTION

In any given area, there may be multiple wireless local area networks (WLANs). These WLANs overlap each other. The problem to be solved is how to provide means and information for a WLAN to select a channel and cooperatively share a channel with other WLANs if multiple WLANs operate on the same channel. Exemplary embodiments of the present invention are described using an IEEE 802.11 wireless local area network (WLAN). However, the present invention can be used in other wireless networks.

The present invention provides a means and information for wireless networks, especially wireless local area networks (wireless LANs), to select their operating channels, share the channels with other wireless LANs, and manage their traffic efficiently. The present invention facilitates the coexistence of multiple wireless LANs and mitigates the interference as well as improving the overall network efficiency and user experience. Although IEEE 802.11 wireless LANs are used to explain the invention. The present invention can also be used for other types of wireless networks, including wireless personal are networks (WPANs), WiMax networks, wireless mesh networks, ad hoc wireless networks, peer-to-peer wireless networks, cellular networks, femtocells.

Described herein are a method and apparatus including calculating an aggregate peak total traffic demand for all overlapping access points in an interference range, comparing the aggregate peak total traffic demand to a threshold, rejecting a requested new quality of service traffic stream responsive to results of the comparison, calculating a peak total traffic demand for each overlapping access point in the interference range if the requested new quality of service traffic stream is admissible responsive to results of the comparison, comparing the peak total traffic demand for each overlapping access point in the interference range, if the requested new quality of service traffic stream is admissible, to the threshold and one of accepting the requested new quality of service traffic stream and rejecting the requested new quality of service traffic stream responsive to results of the second comparison.

BRIEF DESCRIPTION OF THE DRAWINGS

The present invention is best understood from the following detailed description when read in conjunction with the accompanying drawings. The drawings include the following figures briefly described below:

FIG. 2 shows an exemplary overlapping QLoad report element in accordance with the principles of the present invention.

FIG. 3 shows an exemplary overlapping QLoad field in accordance with the principles of the present invention.

FIG. 4 shows an alternative QLoad (traffic) load field in accordance with the principles of the present invention.

DETAILED DESCRIPTION OF THE PREFERRED EMBODIMENTS

Figure 1:
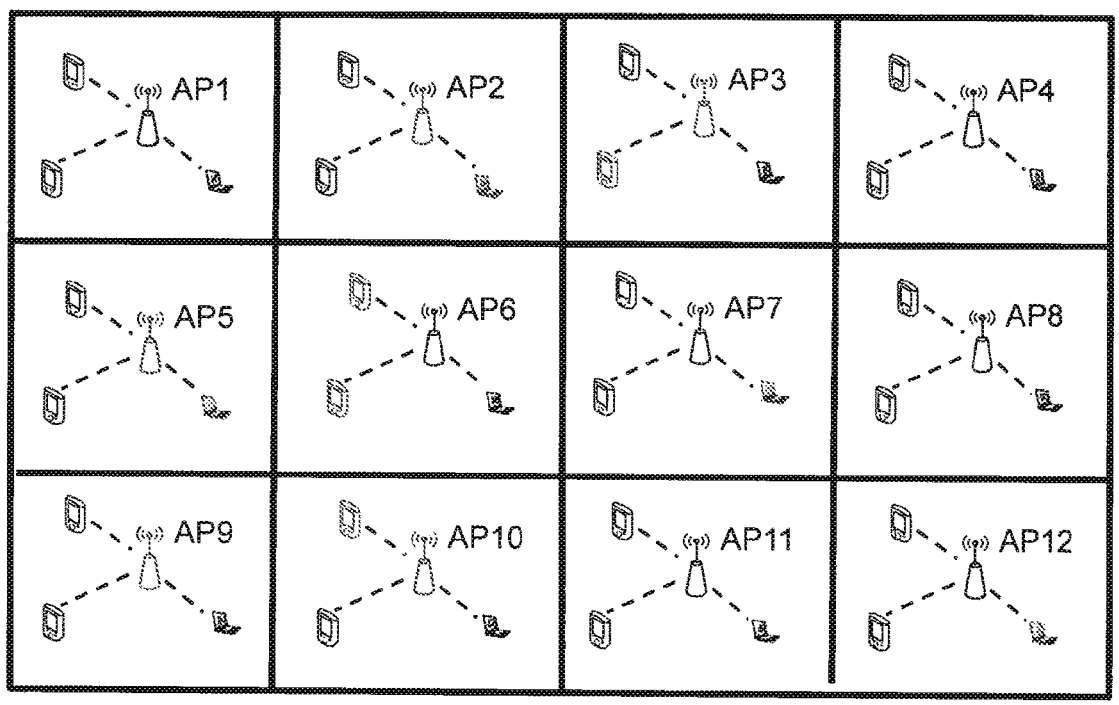
FIG. 1 shows multiple WLANs in an area.

As shown in FIG. 1, multiple wireless LANs exist in an area, e.g. in a building, a community, a campus. A WLAN includes an access point (AP) and the associated stations (STAs). A WLAN is also called a basic service set (BSS). An access point advertises (provides, reports, propagates, transmits, forwards) the traffic load or the quality-of-service (QoS) traffic load of its WLAN/BSS in its beacons or other management (control) signals (frames, packets). The quality-of-service (QoS) traffic is the traffic that requires a certain QoS, e.g. packet loss rate, delay and throughput. Such QoS traffic includes video and voice streams (flows). The QoS traffic load of the WLAN/BSS advertised by an AP includes all the QoS traffic for the AP and its associated STAs in this WLAN/BSS. Furthermore, an access point also advertises (provides, reports, propagates) the traffic load or the QoS traffic load for each of its N-hop neighbor WLANs/BSSs in its beacons or other management (control) signals (frames, packets). The AP can obtains the QoS traffic load information of its neighbor WLANs/BSSs by passively listening to the beacons (or other signals) from its neighbor APs or proactively requesting the information from its neighbor APs through management (control) message exchanges. The QoS traffic load information report for each of its N-hop neighbor WLANs/BSSs will provide information to other APs to enable channel selection, traffic management (e.g. admission control and traffic shaping) and channel sharing as described later herein. A special case is N=1, i.e. an AP advertises (provides, reports, propagates) the traffic load or the QoS traffic load for each of its 1-hop neighbor WLANs/BSSes in its beacons or other management (control) signals (frames, packets). In addition, the QoS traffic load (QLoad) information can be reported in two formats: the current allocated QoS traffic load (AQLoad) and the potential peak QoS traffic load (PQLoad). The current allocated QoS traffic for a WLAN/BSS indicates the active QoS traffic load that the AP and its WLAN/BSS have allocated at the current time. That is, the AQLOAD represents the current active composite traffic stream that has been allocated for the BSS/WLAN. The potential QoS traffic indicates the potential peak (maximum) QoS traffic that the AP and its WLAN/BSS are expecting. That is, the potential QoS traffic load (PQLOAD) represents the composite QoS traffic stream for the BSS if all the potential traffic flows (streams) in the BSS to or from the non-AP STAs become active. It is possible for an AP or a STA to reserve some bandwidth for future traffic. For example, a STA can reserve a traffic flow (stream) for watching a TV show in the future. The traffic for the TV show will include in the potential QoS traffic, but does not include in the current allocated QoS traffic. The potential QoS traffic for an AP is equal to or greater than its allocated QoS traffic.

The Overlapping QLoad Advertisements (Reports) information element (IE) can be used by an AP to advertise (report, provide, propagate, transmit, forward) the QLoad of its overlapping APs, besides its own QLoad. The overlapping APs are APs that are on the same channel and can receive beacons (or other management or control signals (frames, packets) to and from each other directly or through associated STAs. This element can be carried in selected beacon frames within a chosen interval. The selected beacon frame transmitted by an AP includes the QLoad report element for the AP itself and the overlapping QLoad report element for its overlapping APs. The overlapping QLoad report element is also transmitted in a QLoad Report (frame, packet). An AP can send a QLoad Report Request (frame, packet) to request information from another AP. The AP, that has received such a request and responds to the request, transmits the QLoad Report frame (signal, packet) to the requesting AP to respond to the QLoad Report Request. When there is a change in the contents of the QLoad Report frame (packet, signal), an unsolicited QLoad Report frame (signal, packet) is transmitted. The QLoad Report frame sent by an AP includes the QLoad report element for the AP itself and the overlapping QLoad report element for any overlapping APs of which the reporting AP is aware and for which information is available.

FIG. 2 shows an exemplary overlapping QLoad report element in accordance with the principles of the present invention. The element ID field identifies this IE and the length field indicates the size of this IE. The number of reported overlapping QLoads specifies the number, n, of overlapping QLoads reported in this element. A value of zero indicates that no overlapping QLoads are reported. The overlapping QLoad 1 through overlapping QLoad n fields specify the reported QLoad of any overlapping APs of which the reporting AP is aware for which information is available. Each overlapping QLoad field includes an AP/BSS ID, a potential QLoad (PQLoad) field and an allocated QLoad (AQLoad) field.

FIG. 3 shows an exemplary overlapping QLoad field in accordance with the principles of the present invention. That is each overlapping QLOAD field shown in FIG. 2 has the three fields shown in FIG. 3.

The AP ID can be the medium access control (MAC) address of the AP (the reporting AP or the APs on which the reporting AP is reporting) or the basic service set identification (BSSID) of the BSS/WLAN for which the QLoad is reported. The potential QLoad field includes a QLoad field and specifies the total potential QoS traffic for the AP and its BSS identified by the AP ID field, which represents the potential composite traffic stream that is expected if all the potential streams in this BSS become active and are summed. The Allocated QLoad field includes a QLoad field and indicates the total allocated composite QoS traffic for the AP and its BSS identified by the AP ID field, which represents the composite traffic stream that is the sum of all the active streams in the BSS allocated by the AP at the present (current) time. The QLoad (traffic) load field can be expressed as the value of channel (medium) time or a fraction of channel (medium) time required for transmitting the traffic. If this value is expressed as a fraction, the fraction is a fraction of time in portions of a second over a period of one second. The potential QLoad represents the potential QoS traffic of this AP/BSS and therefore is always equal to or greater than the values represented by the allocated QLoad field. The values in the potential QLoad field can be set to be the values in the Allocated QLoad field if there is no traffic expected (predicted, reserved) for the future.

In an alternative embodiment, The QLoad (traffic) load field is expressed as a mean and standard deviation (stdev)/variance (var) as well as the number of video and voice streams. FIG. 4 shows an alternative QLoad (traffic) load field in accordance with the principles of the present invention. The mean (sub)field indicates the mean medium (channel) time required to transmit the total allocated active QoS traffic. The standard deviation (variance) (sub)field indicates the standard deviation (variance) of the medium (channel) time required to transmit the QoS traffic. The number of video streams indicates the number of video streams in the QoS traffic (QLoad). The number of voice streams indicates the number of voice streams in the QoS traffic (QLoad). The potential QLoad and allocated QLoad are expressed as the channel (medium) time required for transmitting the traffic. The PQLoad and AQLoad do not include the channel (medium) access overhead that depends on the medium access control protocol and the number of overlapping APs in the neighborhood.

An AP/BSS can select an operating channel to mitigate interference with other APs/BSSs according to the information of the QLoad report and the overlapping QLoad report received from its overlapping APs. The AP first tries to find and select a clean channel without any overlapping AP within the interference range. After scanning all the possible channels, if no clean channel is available (all the channels are already occupied), the AP will try to select a channel without overlapping QoS APs within the interference range. A QoS AP is an AP that has QoS capability and supports QoS enhanced distributed channel access or hybrid coordination function controlled channel access. A QoS AP may support admission control and advertise the QLoad report and the overlapping QLoad report. If no channel without an overlapping QoS AP is available (i.e. each of the possible channels is occupied by at least one QoS AP), the AP selects the channel on which the sum of the potential QLoad from its overlapping APs is the smallest. If there is more than one channel with the same value of the smallest potential QLoad, to break the tie, the AP selects the channel with the least overlap degree with other QoS APs. The overlap degree of an AP is the number of QoS APs that overlaps this AP. If there is more than one channel with the same value of the least overlap degree, to break the tie, the AP selects the channel so that the overlap degree for its neighbor APs with maximum overlap degree is minimized.

Multiple APs may share a channel. To prevent a new stream (flow) from degrading the QoS of existing streams (flows) in an overlapped BSS environment, the AP/BSS performs admission control. When an AP makes decision whether to accept a new stream, it considers the effect of the allocated QLoad on itself, its overlapping APs, and the overlapping APs of its overlapping APs. For example, assume that all the WLANs in FIG. 1 operate on (over) the same channel. If AP1 admits a new traffic flow, the total traffic load of WLAN1 and its interfering WLANs (WLAN2, WLAN5 and WLAN6) are less than the available wireless channel capacity. The new traffic flow and existing traffic flows in WLAN 1 will not be degraded. However, the total traffic load of WLAN2 and its interfering WLANs (WLAN1, WLAN3, WLAN5, WLAN6, WLAN7) may be greater than the available channel capacity so that the QoS of the traffic flows in WLAN2 is degraded.

Parallel transmissions are possible for non-overlapping APs. If APs j and k both overlap AP i (included in the overlapping QLoad report of AP i, but do not overlap each other (i.e. AP j is not included in the overlapping QLoad report of AP k and AP k is not included in the overlapping QLoad report of AP j), APs j and k are called a parallel transmission pair with APi. For example, in FIG. 1, if AP1 and AP3 do not overlap each other but each overlaps AP2, AP1 and AP3 can transmit in parallel and are called a parallel transmission pair with AP2. The parallel transmission reduces the total channel (medium) time. Furthermore, an AP can form multiple parallel transmission pairs. For example in FIG. 1, if AP1 and AP7 do not overlap each other but each overlaps AP2, AP1 and AP7 can form a parallel transmission pair with AP2.

Assuming the mean and standard deviation of the allocated QLoad for an AP/BSSi are MEAN(i) and STDEV(i), respectively. The peak allocated QLoad for AP/BSSi is $L(i)=\text{MEAN}(i)+2\times\text{STDEV}(i)$. Assuming APj and APk form a parallel transmission pair, the mean of the effective channel (medium) time is then $P_{jk}=\text{MEAN}(j)\times\text{MEAN}(k)$ For an APi, $j \in O[i]$ denotes the set of APs overlapping with APi, and $j \in O[i]$ is called the overlapping set of APi. For an APj that is an overlapping AP with APi, $k \in P[j,i]$ denotes the set of APs each of which with APj form the parallel transmission pair to APi. $k \in P[j,i]$ is called as the parallel transmission pair set of APj to APi. Herein the parallel transmission degree of APj with APi is defined as $$P_{ji} = \text{MEAN}(j) \times \left( \sum_{k \in P[j,i]} \text{MEAN}(k) \right).$$

Note that MEAN(*) here is the fraction of channel (medium) time in units of fractions of a second over a period of one second to transmit the traffic. In case $P_{ji}>1$, set $P_{ji}=1$. The total parallel transmission degree of APi is then $$P_i = 1/2 \sum_{j \in O[i]} P_{ji} = 1/2 \sum_{j \in O[i]} \left[ \text{MEAN}(j) \times \left( \sum_{k \in P[j,i]} \text{MEAN}(k) \right) \right]$$

½ in the above equation is because APs j and k forms a parallel transmission pair and should be counted only once.

Considering the parallel transmission, the mean of the effective allocated QLoad of an overlapping APj to APi is equal to $$eMEAN_i(j) =$$
$$\text{MEAN}(j) - P_{ji}/2 = \text{MEAN}(j) - \left( \text{MEAN}(j) \times \left( \sum_{k \in P[j,i]} \text{MEAN}(k) \right) \right) \Big/ 2$$

By taking the parallel transmission into account, an AP can calculate the mean and standard deviation of the total effective allocated overlap QLoad for all overlapping APs as $$tMEAN(i) = \text{MEAN}(i) + \sum_{j \in O[i]} eMEAN_i(j)$$

$$tSTDEV(i) = sqrt\left[ STDEV^2(i) + \sum_{j \in O[i]} STDEV^2(j) \right]$$

The total effective peak allocated QLoad for AP/BSSi is $tL(i)=tMEAN(i)+2\times tSTDEV(i)$.

The channel access overhead by the medium access control protocol should also be considered. B denotes the bandwidth factor which considers the channel access overhead. The bandwidth factor B depends on the number of overlapping APs (QoS APs) and the number of queues (QoS video and/or voice queues) in all the overlapping BSSs to make up the composite stream that contends for the channel (medium) access. An AP or a non-AP STA may have one or more queues that contend for the channel (medium) access. By taking the channel access overhead into account, the total effective overlap traffic demand is $T(i)=B\times tL(i)$ An AP can report (advertise, provide, transmit, propagate) the effective mean and standard deviation of the total allocated overlap QLoad, in selective beacons and other management (control) frames (packets, signals) such as QLoad reports to provide information to other APs for channel selection, channel sharing and traffic management. An AP can also report (advertise, provide, transmit, propagate) the total effective peak overlap traffic and bandwidth factor in selective beacons and other management (control) frames (packets, signals) such as QLoad reports to provide information to other APs for channel selection, channel sharing and traffic management.

The effective potential QLoad (PQLoad) can be calculated in a similar way as the effective allocated QLoad, in which the mean and standard deviation of the potential QLoad for each of AP is used. An AP can report (advertise, provide, transmit, propagate) the effective mean and standard deviation of the total overlap potential QLoad, in selective beacons and other management (control) frames (packets, signals) such as QLoad reports to provide information to other APs for channel selection, channel sharing and traffic management. An AP can also report (advertise, provide, transmit, propagate) the peak value of the total effective potential traffic load and bandwidth factor in selective beacons and other management (control) frames (packets, signals) such as QLoad reports to provide information to other APs for channel selection, channel sharing and traffic management.

When APi decides whether to admit a new stream n that is requested into its BSS, it examines the allocated QLoad and overlapping allocated QLoad reports. APi adds the requested new stream to its own allocated QLoad and calculates its new mean and standard deviation of the composite stream as $$MEAN(i)=MEAN(i)+MEANnew$$

$$STDEV(i)=sqrt(STDEV^2(i)+STDEV^2new)$$

By taking the parallel transmissions into account, APi calculates the mean and standard deviation of the total effective allocated overlap QLoad for all overlapping APs in the interference range of APi including APi's own allocated QLoad with the new requested stream using the re-calculated mean and standard deviation as $$tMEAN(i) = MEAN(i) + \sum_{j \in O[i]} eMEAN_i(j)$$

$$tSTDEV(i) = sqrt\left[STDEV^2(i) + \sum_{j \in O[i]} STDEV^2(j)\right]$$

The peak value of the total effective allocated QLoad for all overlapping APs in the interference range of APi, including APi's own allocated QLoad with the new requested stream using the re-calculated mean and standard deviation of the total effective allocated overlap QLoad for all overlapping APs in the interference range of APi is $$tL(i)=tMEAN(i)+2 \times tSTDEV(i)$$

Next the new stream is considered and the new bandwidth factor is determined. APi calculates the peak total traffic demand by multiplying the peak value calculated above by the new bandwidth factor, which considers the parallel transmission effect and channel (medium) access overhead.

$$T(i)=B \times tL(i)$$

APi determines whether the peak total traffic demand is less than or equal to one if the new stream is admitted. If the peak total traffic demand $T(i)=B \times eL(i)>1$, the new stream request is rejected.

If the peak total traffic demand $T(i)=B \times eL(i) \leq 1$, APi continues checking to determine if the peak total traffic demand value for each of its overlapping APs in the interference neighborhood is less than or equal to one if the requested new stream is admitted. Given an overlapping APj, the peak total traffic demand for APj is equal to $$T(j)=B \times tL(j)$$

where $$tMEAN(j)=tMEAN(j)+MEANnew$$

$$tSTDEV(j)=sqrt(STDEV^2(j)+STDEV^2new)$$

$$tL(j)=tMEAN(j)+2 \times tSTDEV(j)$$

If the peak total traffic demand $T(j)=B \times eL(j) \leq 1$ for every overlapping APj, the new requested stream is admitted (accepted, allocated). Otherwise, the new stream is rejected. When calculating $T(j)=B \times eL(j)$, for simplicity, the parallel transmission effect of the new stream may not be considered.

Figure 5:
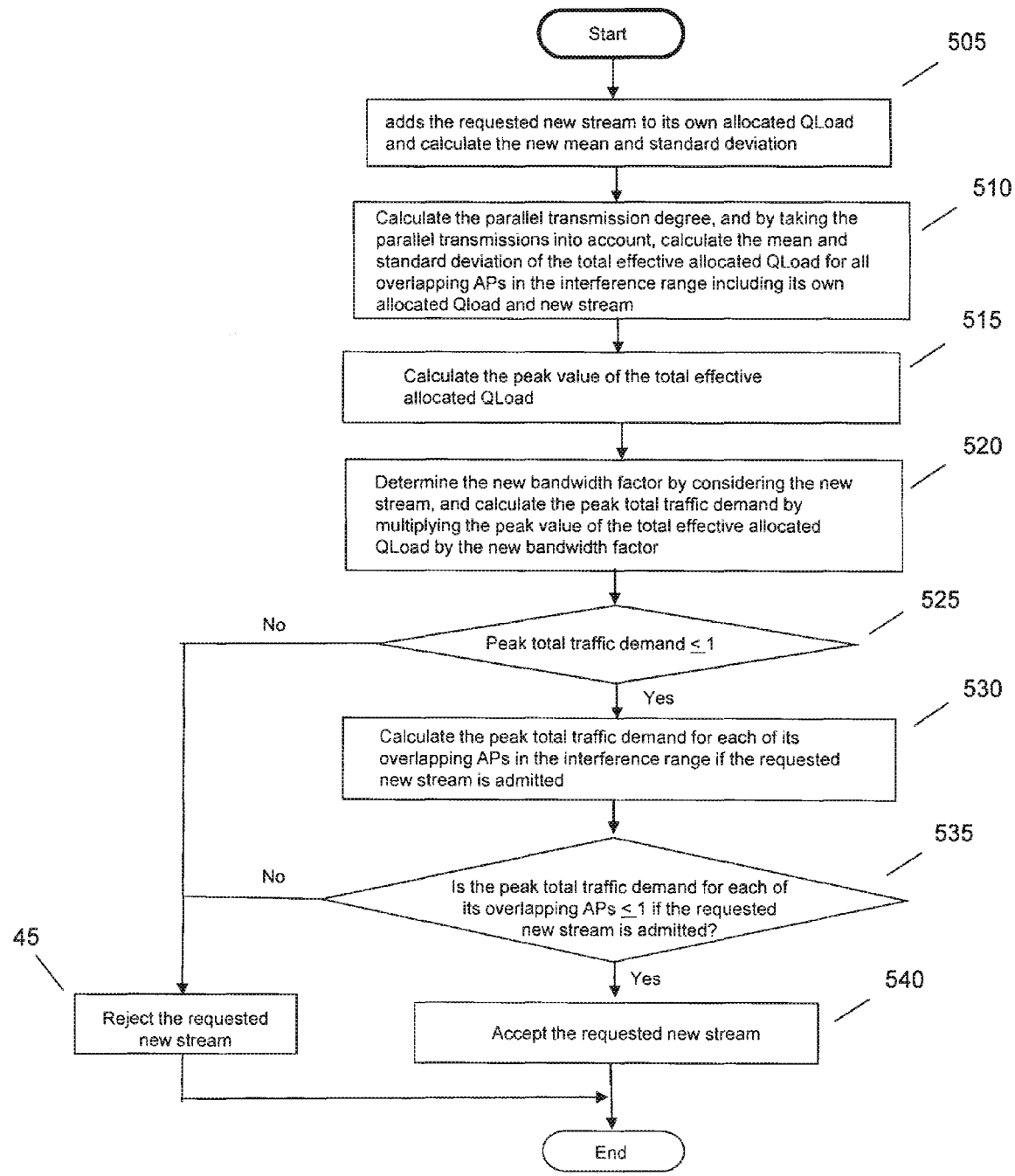
FIG. 5 is a flowchart for an AP's admission process of a new requested stream in accordance to the present invention.

FIG. 5 shows a flowchart for an AP's admission process of a new requested stream in accordance to the present invention. At 505 APi adds the requested new stream to its own allocated QLoad and calculates its new mean and standard deviation of the composite stream. At 510, APi considers parallel transmissions and calculates the mean and standard deviation of the total effective allocated overlap QLoad for all overlapping APs in the interference range of APi including APi's own allocated QLoad with the new requested stream using the re-calculated mean and standard deviation. APi also calculates the parallel transmission degree. A parallel transmission degree is calculated for both active QLoad and potential QLoad in a similar manner. At 515 APi calculates the peak value of the total effective allocated QLoad for all overlapping APs in the interference range of APi, including APi's own allocated QLoad with the new requested stream using the re-calculated mean and standard deviation of the total effective allocated overlap QLoad for all overlapping APs in the interference range of APi. At 520 APi determines a new bandwidth factor by considering the new stream APi calculates the peak total traffic demand by multiplying the peak value calculated above (515) by the new bandwidth factor, which considers the parallel transmission effect and channel (medium) access overhead. At 525 a test is performed to determine if the peak total traffic demand is less than or equal to 1 if the new stream is admitted. The peak total traffic demand is greater than 1 if the new stream is admitted then at 545 the new stream is rejected. If peak total traffic demand is less than or equal to 1 if the new stream is admitted, then at 530 APi calculates the peak total traffic demand for each of its overlapping APs in the interference range if the new stream is admitted. At 535 a test is performed to determine if the peak total traffic demand for every overlapping AP in the interference range is less than or equal to 1 if the new requested stream is admitted. If the peak total traffic demand for every overlapping AP in the interference range is less than or equal to 1 if the new requested stream can be admitted then at 540 the new stream is admitted (accepted). If the peak total traffic demand for every overlapping AP in the interference range is greater than 1 if the new requested stream is admitted then the at 545 the new stream is rejected.

As described above regarding an AP's admission process the current (active) traffic is used. Alternatively, the AP can use the potential QLoad admitting a stream in the same way.

Figure 6:
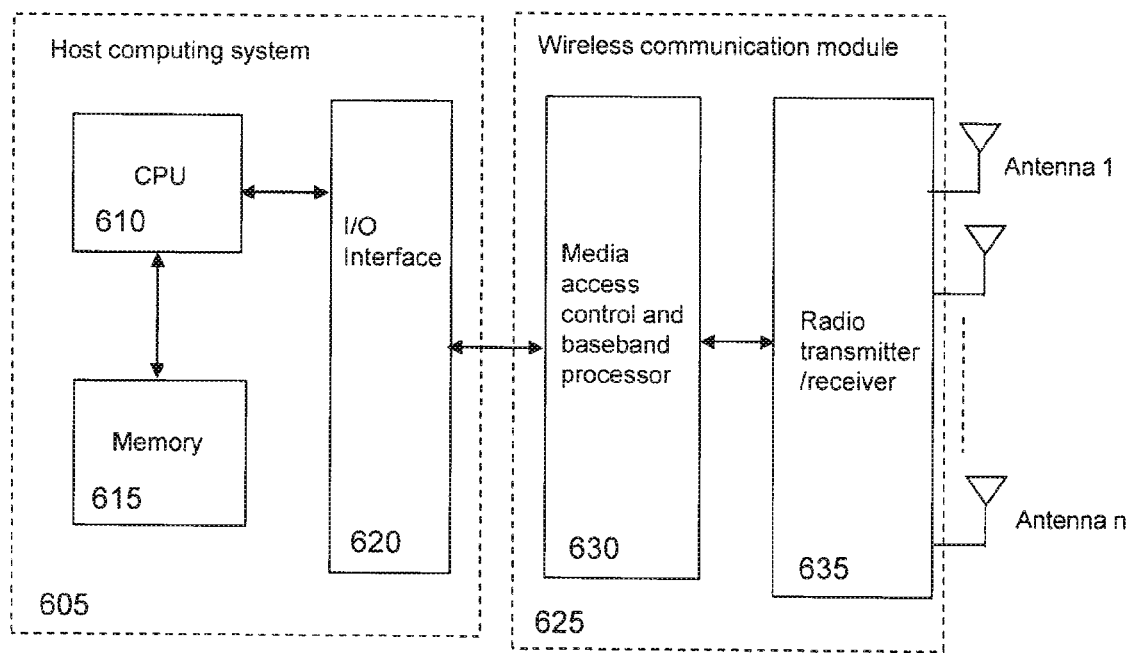
FIG. 6 is a block diagram of an exemplary wireless device implementation of the present invention.

Referring now to FIG. 6, which is a block diagram of an exemplary wireless device implementation of the present invention. Since a wireless device (station, node, gateway, AP, base station) can be a transmitter, a receiver or a transceiver, a single block diagram is used showing a wireless communication module 625 having a radio transmitter/receiver 635. That is, the radio transmitter/receiver can be a transmitter, a receiver or a transceiver. The present invention includes a host computing system 605 and a communication module (wireless) 625. The host processing system can be a general-purpose computer or a specific-purpose computing system. The host computing system can include a central processing unit (CPU) 610, a memory 615 and an input/output (I/O) interface 620. The wireless communication module 625 can include a media access control (MAC) and baseband processor 630, radio transmitter/receiver 635, and one or more antennas. An antenna transmits and receives the radio signals. The radio transmitter/receiver 635 performs radio signal processing. The MAC and baseband processor 630 performs MAC control and data framing, modulation/demodulation, coding/decoding for the transmission/receiving. At least one embodiment of the present invention can be implemented as a routine in the host computing system or wireless communication module to process the transmission and receiving of data and control signal. That is, the block diagram of FIG. 6 may be implemented as hardware, software, firmware, a field programmable gate array (FPGA), an application specific integrated circuit (ASIC), a reduced instruction set computer (RISC) or any combination thereof. Further, the exemplary processes illustrated in the various flowcharts and text above are operationally implemented in either the host processing system or the wireless communication module or a combination of the host processing system and the communication module. The block diagram thus fully enables the various methods/processes to be practiced in hardware, software, firmware, a field programmable gate array (FPGA), an application specific integrated circuit (ASIC), a reduced instruction set computer (RISC) or any combination thereof.

Specifically, the AP operates as a wireless device and operate in either the CPU of the host computing system 705 or the MAC and baseband processor of the wireless communication module 725 or a combination of both the CPU of the host computing system and the MAC and baseband processor of the wireless communication module and admits or rejects a new requested stream. The CPU of the host computing system and/or the MAC and baseband processor of the wireless communication module include means for calculating an aggregate peak total traffic demand for all overlapping access points in an interference range, means for comparing the aggregate peak total traffic demand to a threshold, means for rejecting a requested new quality of service traffic stream responsive to results of the comparison, means for calculating a peak total traffic demand for each overlapping access point in the interference range if the requested new quality of service traffic stream is admissible responsive to results of the comparison, means for comparing the peak total traffic demand for each overlapping access point in the interference range, if the requested new quality of service traffic stream is admissible, to the threshold and means for activating one of accepting the requested new quality of service traffic stream and rejecting the requested new quality of service traffic stream responsive to results of the second comparison. The AP operating as a wireless device and operating in either the CPU of the host computing system 705 or the MAC and baseband processor of the wireless communication module 725 or a combination of both the CPU of the host computing system and the MAC and baseband processor of the wireless communication module also includes means for adding the requested new quality of service traffic stream to an existing allocated quality of service traffic stream to create a composite quality of service traffic stream, means for calculating a mean and standard deviation of the composite quality of service traffic stream, means for calculating a mean and standard deviation of a total effective allocated overlap quality of service traffic load for all overlapping access points in the interference range, means for calculating a peak value of the total effective allocated quality of service traffic for all overlapping access points in the interference range, means for determining a bandwidth factor responsive to the requested new quality of service traffic stream, and wherein the peak total traffic demand is responsive to the bandwidth factor and the peak value of the total effective allocated quality of service traffic for all overlapping access points in the interference range.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method performed by an access point for adding a requested new quality of service traffic stream in a multiple wireless network environment, said method comprising:
adding said requested new quality of service traffic stream to an existing allocated quality of service traffic stream to create a composite quality of service traffic stream;
calculating a mean and standard deviation of the composite quality of service traffic stream;
calculating a mean and standard deviation of a total effective allocated overlap quality of service traffic load for all overlapping access points in said interference range;
calculating a peak value of the total effective allocated quality of service traffic for all overlapping access points in said interference range;
wherein calculating the peak value of the total effective allocated quality of service traffic for all overlapping access points in said interference range includes using said existing allocated quality of service traffic stream and said requested new quality of service traffic stream and said mean and standard deviation of the composite quality of service traffic stream;

determining a bandwidth factor responsive to said requested new quality of service traffic stream;

calculating a peak total traffic demand for all overlapping access points in said interference range by multiplying the bandwidth factor and the peak value of the total effective allocated quality of service traffic for all overlapping access points in said interference range;

first comparing said peak total traffic demand to a threshold to determine admissibility of said requested new quality of service traffic stream;

rejecting said requested new quality of service traffic stream responsive to results of said first comparison if said first comparison is not admissible according to the threshold;

calculating a peak total traffic demand for each overlapping access point in said interference range if said requested new quality of service traffic stream is admissible according to the threshold of said first comparison;

second comparing said peak total traffic demand for each overlapping access point in said interference range, if said requested new quality of service traffic stream is admissible according to the threshold; and performing one of accepting said requested new quality of service traffic stream by the access point and rejecting said requested new quality of service traffic stream by the access point responsive to results of said second comparison.

2. The method according to claim 1, wherein said bandwidth factor considers an effect of parallel transmission and channel access overhead.

3. The method according to claim 1, wherein an overlapping quality of service report includes an element identification field, a length field, a number of reported overlapping quality of service traffic loads field and an overlapping quality of service traffic load field.

4. The method according to claim 3, wherein said element identification field identifies a current information element, and wherein said length field indicates a size of said current information element, and wherein said number of reported overlapping quality of service traffic loads field specifies a number of overlapping quality of service traffic loads reported in said current information element, and wherein said overlapping quality of service traffic load field specifies a quality of service traffic load of any overlapping access points of which a reporting access point is aware and for which information is available.

5. The method according to claim 4, wherein said overlapping quality of service traffic load field includes an identification of an access point and an allocated quality of service traffic load field.

6. The method according to claim 4, wherein said overlapping quality of service traffic load field includes a mean field, a standard deviation field, a number of video streams field and a number of voice streams field.

7. The method according to claim 6, wherein said mean field indicates a mean channel time required to transmit the total allocated active quality of service traffic and, wherein said standard deviation field indicates a standard deviation of the channel time required to transmit the total allocated active quality of service traffic.

8. The method according to claim 6, wherein said number of video streams indicates the number of video streams in the total allocated active quality of service traffic load and wherein said number of voice streams indicates a number of voice streams in the quality of service traffic load.

9. An apparatus for adding a requested new quality of service traffic stream in a multiple wireless network environment, the apparatus comprising:

a wireless module that adds said requested new quality of service traffic stream to an existing allocated quality of service traffic stream to create a composite quality of service traffic stream; and a processor for calculating a mean and standard deviation of the composite quality of service traffic stream, calculating a mean and standard deviation of a total effective allocated overlap quality of service traffic load for all overlapping access points in said interference range, calculating a peak value of the total effective allocated quality of service traffic for all overlapping access points in said interference range, wherein calculating the peak value of the total effective allocated quality of service traffic for all overlapping access points in said interference range includes using said existing allocated quality of service traffic stream and said requested new quality of service traffic stream and said mean and standard deviation of the composite quality of service traffic stream, and determining a bandwidth factor responsive to said requested new quality of service traffic stream;

the processor calculating a peak total traffic demand for all overlapping access points in said interference range by multiplying the bandwidth factor and the peak value of the total effective allocated quality of service traffic for all overlapping access points in said interference range;

the processor performing a first comparison of said peak total traffic demand to a threshold to determine admissibility of said requested new quality of service traffic stream, and rejecting said requested new quality of service traffic stream responsive to results of said first comparison is not admissible according to the threshold;

the processor calculating a peak total traffic demand for each overlapping access point in said interference range if said requested new quality of service traffic stream is admissible according to the threshold of said first comparison;

the processor performing a second comparison of said peak total traffic demand for each overlapping access point in said interference range, if said requested new quality of service traffic stream is admissible according to the threshold; and activating one of accepting said requested new quality of service traffic stream and rejecting said requested new quality of service traffic stream responsive to results of said second comparison.

10. The apparatus according to claim 9, wherein said bandwidth factor considers an effect of parallel transmission and channel access overhead.

* * * * *